United States Patent
Humphrey et al.

(10) Patent No.: US 6,318,180 B1
(45) Date of Patent: Nov. 20, 2001

(54) METHOD AND APPARATUS FOR DETERMINING A FREQUENCY AT WHICH A RESONATOR RESONATES

(75) Inventors: Francis Alan Humphrey; David Byrne; Barry Leonard Price, all of Leics (GB)

(73) Assignee: Lattice Intellectual Property Ltd., London (GB)

( * ) Notice: Subject to any disclaimer, the term of this patent is extended or adjusted under 35 U.S.C. 154(b) by 0 days.

(21) Appl. No.: 09/720,031

(22) PCT Filed: Jun. 17, 1999

(86) PCT No.: PCT/GB99/01927

§ 371 Date: Feb. 15, 2001

§ 102(e) Date: Feb. 15, 2001

(87) PCT Pub. No.: WO99/67608

PCT Pub. Date: Dec. 29, 1999

(30) Foreign Application Priority Data

Jun. 24, 1998 (GB) .................................................. 9813514

(51) Int. Cl.[7] .................................................. G01N 29/12
(52) U.S. Cl. ................................. 73/622; 73/1.82; 73/591; 73/618; 73/648
(58) Field of Search .............................. 73/622, 579, 597, 73/599, 607, 618, 624, 645, 617, 644, 648, 591, 1.82; 381/56, 58, 59

(56) References Cited

U.S. PATENT DOCUMENTS

| 4,233,843 | * | 11/1980 | Thompson et al. ..................... 73/579 |
| 5,074,419 | * | 12/1991 | Stearns .................................... 73/579 |
| 5,210,718 | * | 5/1993 | Bjelland et al. ......................... 367/13 |
| 5,211,054 | * | 5/1993 | Muramatsu et al. ................. 73/64.42 |
| 5,251,482 | * | 10/1993 | Bates et al. ......................... 73/290 V |
| 5,406,503 | * | 4/1995 | Williams, Jr. et al. ................. 73/579 |
| 5,528,924 | * | 6/1996 | Wajid et al. ............................. 73/579 |

* cited by examiner

Primary Examiner—Hezron Williams
Assistant Examiner—Jacques M. Saint-Surin
(74) Attorney, Agent, or Firm—William H. Holt

(57) ABSTRACT

Determininig a frequency at which a resonator resonates comprising: driving an acoustic transmitter for applying an acoustic signal to the interior of a resonator by scanning through a first range of frequencies in substantially equidistant steps of a first size; detecting a signal from an acoustic receiver arranged to detect the amplitude of an acoustic signal within the resonator produced by driving the acoustic transmitter over the first range of frequencies; determining a frequency at which a maximum occurs in the detected signal for the first range of frequencies; driving the acoustic transmitter by scanning through a second range of frequencies containing the determined frequency from the first range of frequencies, the second range being smaller than the first range, and scanning through the second range of frequencies in substantially equidistant steps of a second size which is smaller than the steps of the first size; detecting a signal from the acoustic receiver produced by driving the acoustic transmitter over the second range of frequencies and determining a frequency at which a maximum occurs in the detected signal for the second range of frequencies.

23 Claims, 8 Drawing Sheets

METHOD AND APPARATUS FOR DETERMINING A FREQUENCY AT WHICH A RESONATOR RESONATES

The present invention relates to the determination of a frequency, particularly the resonant frequency of a resonator.

To determine the frequency at which a resonator resonates one has to drive the resonator over a range of frequencies with a loudspeaker for example whilst detecting the amplitude of the signal in the resonator with, for example, a microphone for the frequency at which the resonator is currently being driven. The loudspeaker is scanned through the possible range of frequencies at which resonance may occur. To determine the resonant frequency accurately the loudspeaker must be scanned through the possible range of frequencies at which resonance may occur in small steps. For example, to achieve an accuracy of +/−0.5 Hz, the loudspeaker must scan through the range of frequencies in steps of 1 Hz. However, if the range of frequencies that must be scanned is large this will take a long time which may be inconvenient.

According to a first aspect of the present invention a method of determining a frequency at which a resonator resonates comprises:

driving an acoustic transmitter for applying an acoustic signal to the interior of a resonator by scanning through a first range of frequencies in substantially equidistant steps of a first size;

detecting a signal from an acoustic receiver arranged to detect the amplitude of an acoustic signal within the resonator produced by driving the acoustic transmitter over the first range of frequencies;

determining a frequency at which a maximum occurs in the detected signal for the first range of frequencies;

driving the acoustic transmitter by scanning through a second range of frequencies containing the determined frequency from the first range of frequencies, the second range being smaller than the first range, and scanning through the second range in substantially equidistant steps of a second size which is smaller than the steps of the first size;

detecting a signal from the acoustic receiver produced by driving the acoustic transmitter over the second range of frequencies; and determining a frequency at which a maximum occurs in the detected signal for the second range of frequencies.

According to a further aspect of the present invention an apparatus for determining a frequency at which a resonator resonates comprises:

means for driving an acoustic transmitter arranged to apply an acoustic signal to the interior of a resonator by scanning through a first range of frequencies in substantially equidistant steps of a first size;

means for detecting a signal from an acoustic receiver arranged to detect the amplitude of an acoustic signal within the resonator produced by driving the acoustic transmitter over the first range of frequencies;

means for determining a frequency at which a maximum occurs in the detected signal;

means for driving the acoustic transmitter by scanning through a second range of frequencies containing the determined frequency, the second range being smaller than the first range, and scanning through the second range of frequencies in substantially equidistant steps of a second size which is smaller than the first size;

means for detecting a signal from the acoustic receiver produced by driving the acoustic transmitter over the second range of frequencies and means for determining a frequency at which a maximum occurs in the detected signal for the second range of frequencies.

By driving the acoustic transmitter over a first relatively broad range of frequencies with a relatively large frequency step size a coarse value for the resonant peak is quickly obtained for the relatively broad range of frequencies scanned. Having obtained a coarse value for the resonant peak the acoustic transmitter is driven over a second narrower frequency range containing the coarse value for the resonant peak detected earlier to determine the resonant frequency more precisely. The resonant frequency may thus be detected quickly and precisely.

However, a problem with this is that the task of determining the frequency at which the acoustic transmitter is driven at the time that the resonant peak is detected is complicated by the fact that the hardware takes a finite time before a change in the frequency driving the acoustic transmitter results in a change in the detected acoustic receiver amplitude. This results in an error in the detected resultant frequency.

This is solved in a still further aspect of the present invention by scanning each range of frequencies in a first direction and determining a first frequency at which a maximum occurs and then scanning in the opposite direction and determining a second frequency at which a maximum occurs and determining the average of the first and second frequencies at which maxima occurred.

A final value for the frequency at which the maximum occurs in the detected signal is preferably obtained by summing a predetermined number of samples at each frequency at which an acoustic transmitter is driven over a further scan. By summing a predetermined number of samples the effects of random errors such as noise are reduced to produce a more dependable result. As summing a number of samples at each frequency is slower than previous scans, the range of frequencies scanned in the further scan is preferably smaller than that of previous scans to reduce the time taken to perform the scan. The summing scan is preferably the last scan preformed after the resonant frequency has already been substantially identified.

The actual frequency which produces resonance when driving an acoustic transducer is preferably measured by counting the number of its cycles in a predetermined period or by measuring the time taken to produce a predetermined number of cycles.

The invention is described further by way of example with reference to the accompanying drawings in which.

Figure 1:
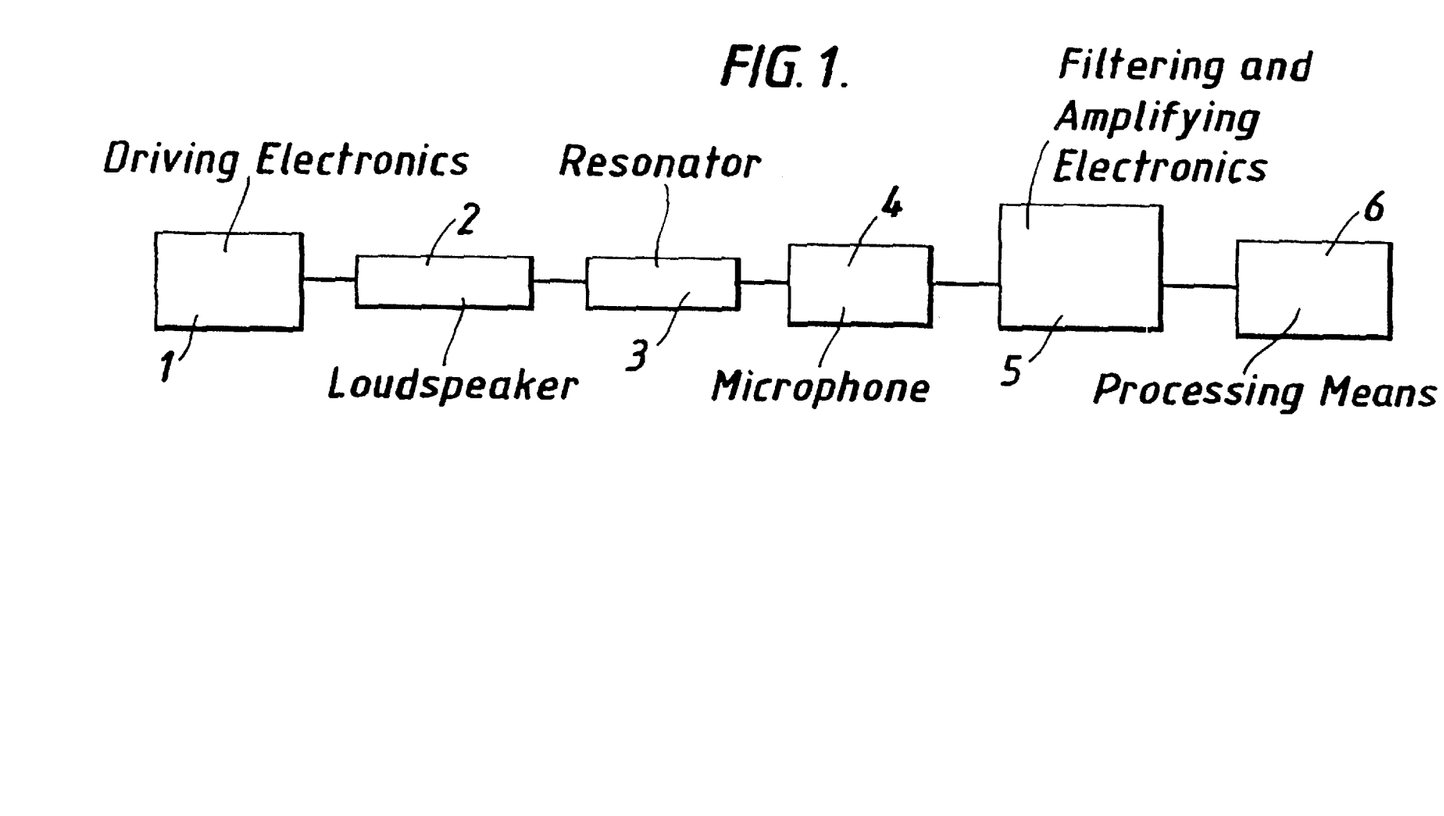
FIG. 1 is a block diagram illustrating the overall operation of a system to measure the speed of sound of a gas using a resonator.

As shown by FIG. 1, driving electronic circuit 1 which may include or be in the form of a microprocessor is arranged to produce a sinusoidal signal over a suitable range of frequencies to drive a loudspeaker 2. The loudspeaker is arranged to apply an acoustic signal to the interior of a resonator 3. Microphone 4 is arranged to pick up the magnitude of the acoustic signal within the resonator. The signal from the microphone is filtered and amplified by an appropriate electronic circuit 5 and a processing means 6 determines the resonant frequency relating to the gas within the resonator to determine its speed of sound.

Figure 2:
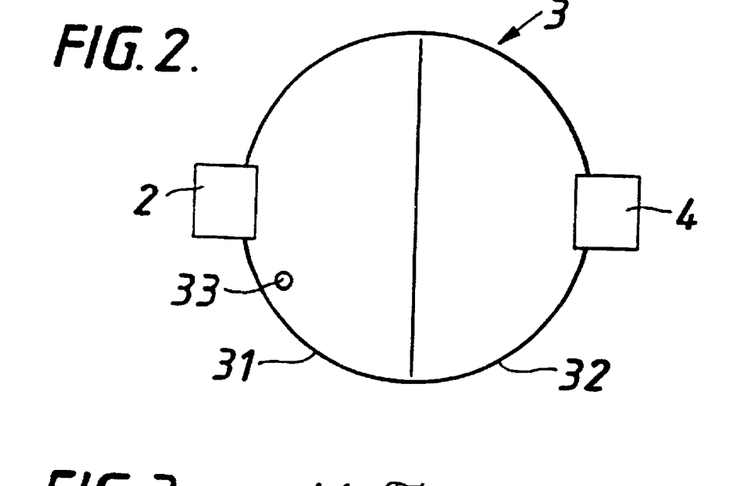
FIG. 2 shows a substantially spherical resonator that can be used in the system.

The resonator 3 shown in FIG. 2 is in this case a rigid sphere. The illustrated resonator is formed from two CNC (computer numerically controlled) machined metal hemispheres 31,32, in this case made of copper, of internal radius 1.5 cm and 3 mm wall thickness welded together to form the sphere.

The apexes of hemispheres 31,32 support the loudspeaker 2 and microphone 4 respectively which when the hemispheres are joined as shown in FIG. 2 are substantially 180° apart which has been found to provide the largest amplitude microphone signal.

The resonator is provided with a number of gas diffusion passages 33, only one of which is shown in FIG. 2, to enable gas to diffuse in and out of the resonator 3. Each hemisphere 31, 32 is preferably provided with four gas diffusion passages 33 positioned 90° apart. Gas diffusion passages 33 are preferably drilled through the resonator housing and any swarf removed to present a regular repeatable surface to the inside of the resonator.

Alternatively the resonating sphere could be made from a porous material such as a sintered material. Gas diffusion holes 33 shown in the copper resonating sphere of FIG. 2 would then not be required and so would reduce perturbations in the resonant frequency due to the holes 33. The porous material used would preferably have a lower thermal expansion than copper, reducing the amount of correction required for variation in the size of the resonator with ambient temperature changes.

The loudspeaker 2 is in this case a miniature loudspeaker as may be used in a hearing aid with a supply voltage of 5V and a power level of approximately 33 mW and the microphone 4 is a sub-miniature microphone.

Figure 3:
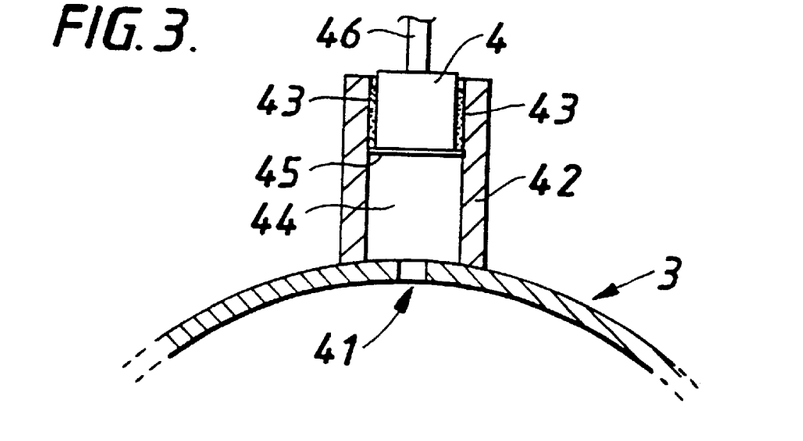
FIG. 3 shows how the acoustic receiver is mounted to the resonator.

FIG. 3 shows how the microphone 4 is mounted to the resonator 3. The resonator is provided with a passage 41 of approximately 1.5 mm diameter which is preferably drilled and any swarf removed. A cylindrical spindle 42 is mounted to or formed as part of the outside of the resonator and arranged concentrically with the passage 41. The spindle 42 is preferably approximately 10 mm in length and has an inner diameter sufficient to accommodate the microphone 4, in this case approximately 5 mm. The position of the microphone 4 within the spindle is variable along its length so that it may be positioned at the optimum point at which the sharpest output signal peak is produced, when the loudspeaker applies the resonant frequency to the resonator. The microphone 4 is secured at the optimum position within the spindle 42 using adhesive 43. The adhesive is preferably prevented from entering the resonator cavity as it could dry in irregular shapes which may cause perturbations in the resonant frequency. The microphone 4 is preferably provided with a rim 45, the outside diameter of which is substantially the same as the inside diameter of the spindle 42 to prevent any adhesive entering the resonator. Alternatively the microphone 4 could fit tightly in the spindle 42. The microphone 4 is connected to the filtering and amplifying electronics 5 by an electrical connection 46.

Figure 4:
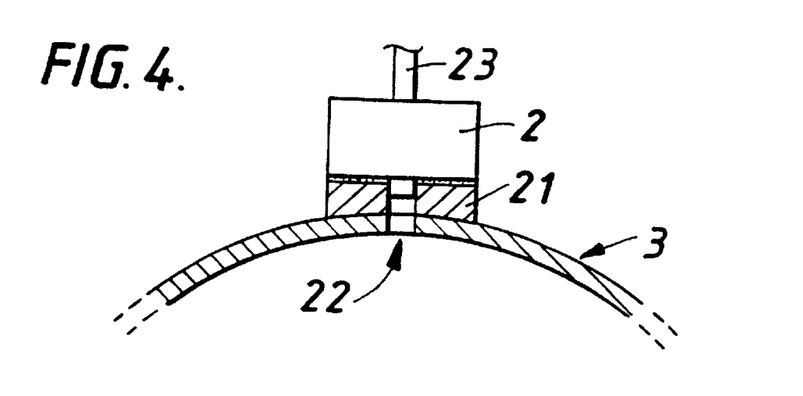
FIG. 4 shows how the acoustic transmitter is mounted to the resonator.

The loudspeaker 2 may be mounted in the same manner as the microphone 4 shown in FIG. 3, but is in this example fixed at a particular distance from the inside of the resonator as shown in FIG. 4.

In FIG. 4 a spindle 21 of approximately 2 mm length is mounted to or formed as part of the outside wall of the resonator 3 and a 1.5 mm passage 22 drilled through the spindle 21 and the resonator wall with any swarf removed. The loudspeaker 2 is mounted to the outside of the spindle 21 covering the passage 22. The loudspeaker is secured to the spindle 21 using adhesive, ensuring that no adhesive enters passage 22 and is electrically connected to the driving electronics 1 by electrical connection 23.

The relative angular separation of the microphone and loudspeaker on the resonator wall may be variable to attain the sharpest output peak. This may be achieved by the position of either the microphone or loudspeaker being fixed with the position of the other being variable.

Because of slight variations in each resonating sphere due to machining tolerances for example producing different effective radii, each resonator is calibrated individually using the expression:

$$c = f \times K$$

Each resonator is calibrated using a gas of known speed of sound (c) found using a computer model for predicting gas characteristics such as GASVLE or by measurement using some suitable method. The resonant frequency (f) is then measured for the gas of known speed of sound in the resonator being calibrated and the constant K found. Using the calibrated resonator together with its associated constant K allows the speed of sound to be determined for any gas from the measured resonant frequency. This gives possible errors of about ±0.1%. By compensating for variations in ambient temperature affecting the volume of the resonator, the speed of sound of a gas may be determined with even smaller possible errors of about ±0.05%.

Figure 5:
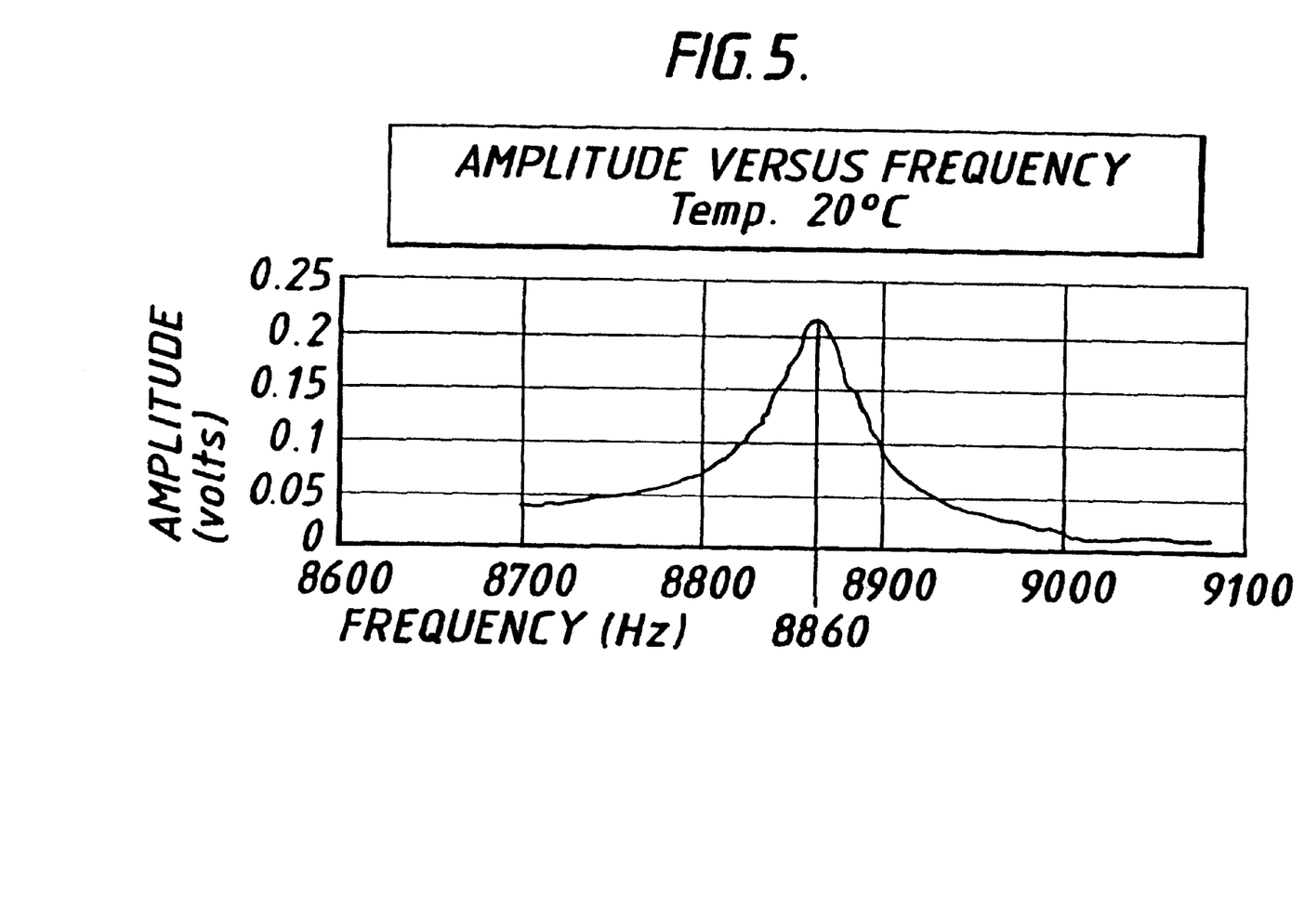
FIG. 5 shows the amplitude of a signal detected by the acoustic receiver over a range of frequencies.

The loudspeaker is driven by an electronic circuit 1 shown diagrammatically in FIG. 1 to provide sinusoidal signals over a frequency range suitable to encompass the frequency of the first non-radial resonance peak of the resonator 3. The loudspeaker is driven in frequency sweeps. The microphone provides an output voltage, which is filtered and amplified, corresponding to the frequency at which the loudspeaker is currently being driven as shown graphically in FIG. 5 with a small delay due to electronics. The frequency at which the microphone produces the largest output voltage is determined to be the non-radial resonant frequency which in FIG. 5 is 8860 Hz at 20° C.

The generation of approximations to sine waves over a continuous range of frequencies is described below.

Figure 6:
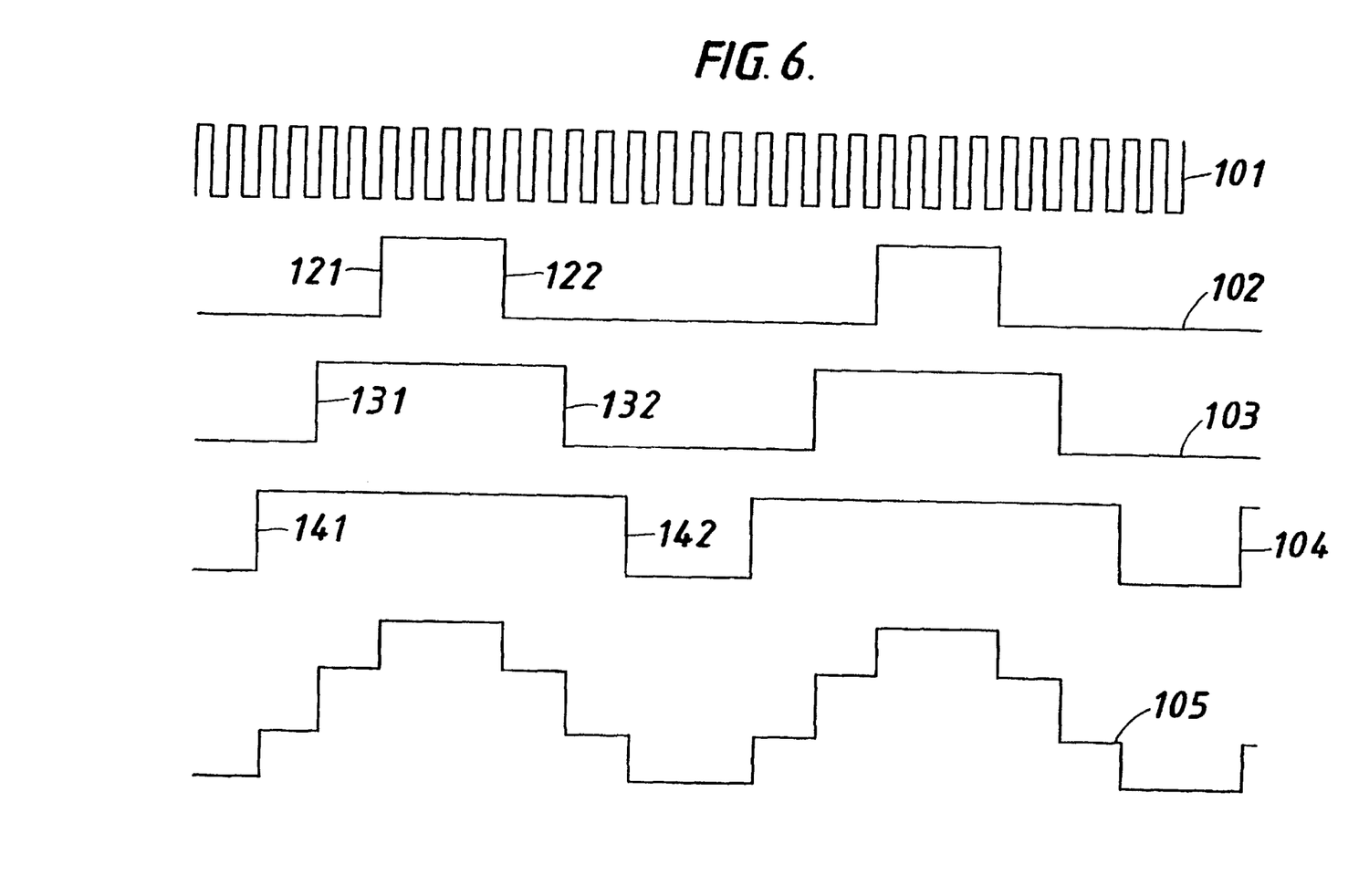
FIG. 6 illustrates how a clock signal is used to produce pulse width modulated signals which are combined to produce an approximation to a sine wave.
Figure 7:
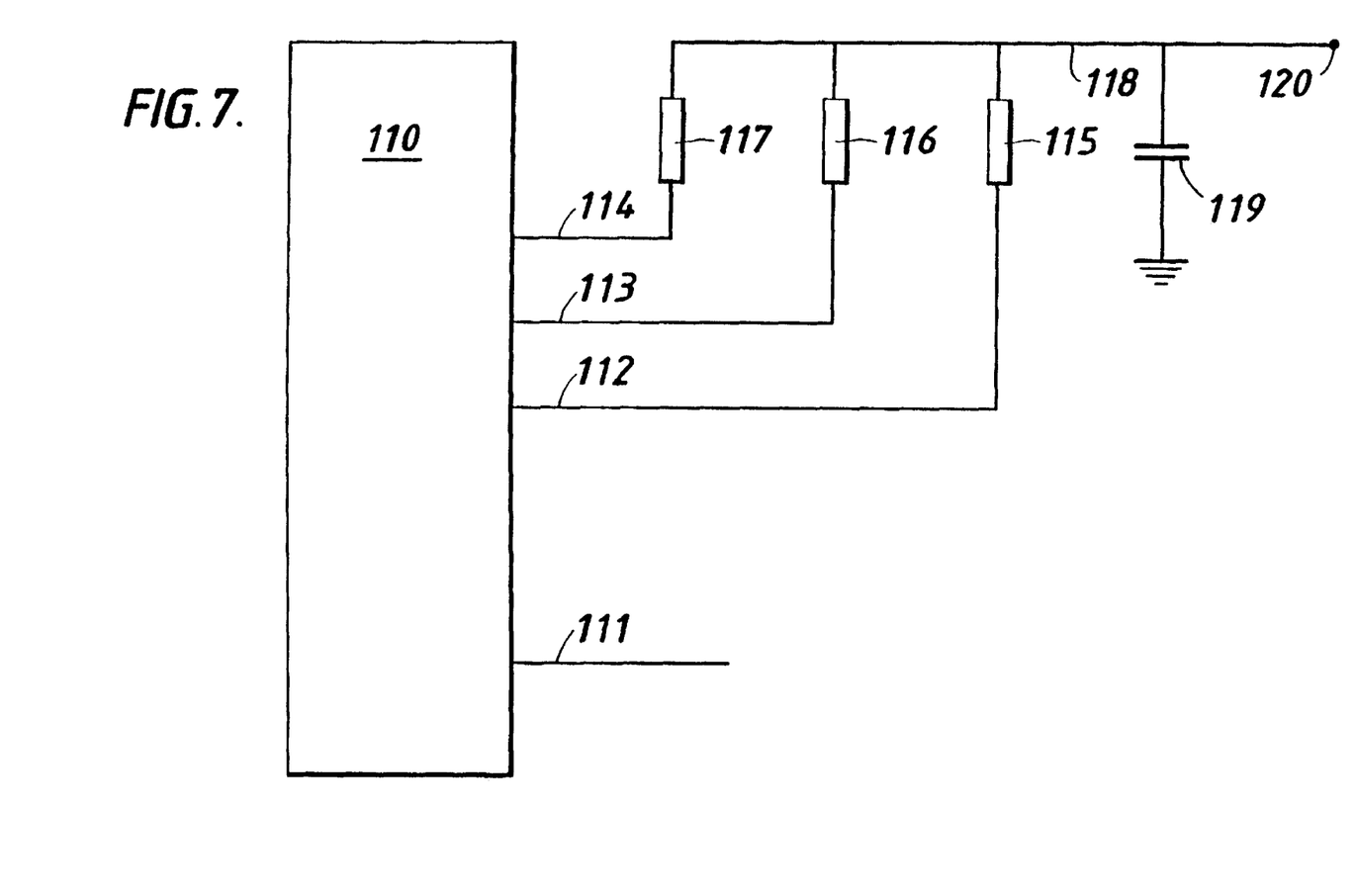
FIG. 7 shows an electronic system to perform the operation illustrated in FIG. 6.

As shown in FIGS. 6 and 7, a clock signal 101 is applied to a microprocessor 110 on line 111 from a voltage controlled oscillator. Any suitable microprocessor may be used such as a Hitachi HD6473048F16. The microprocessor 110 processes the input clock signal 101 from line 111 to produce pulse width modulated (PWM) signals 102,103 and 104 shown in FIG. 6, each of the same frequency on lines 112,113 and 114 respectively. The PWM signals 102, 103, 104 are combined together using a weighted summing arrangement, in this case consisting of resistors 115,116,117 to produce the approximation to a sine wave on line 118. The approximation to a sine wave 105 shown in FIG. 6 has the same frequency as the PWM signals 102,103,104 which each have fixed duty cycles (percentage time on to percentage time off).

In this example each cycle of the synthesised approximation to a sine wave 105 corresponds to sixteen cycles of the clock signal 101, but could be eight or thirty two or any other suitable amount. The rising 121 and falling 122 edges of PWM signal 102 are triggered by the completion of the sixth and tenth cycles of the clock signal 101 respectively. The rising 131 and falling 132 edges of PWM signal 103 are triggered by the completion of the fourth and twelfth cycles of the clock signal 101 respectively. The rising 141 and falling 142 edges of PWM siqnal 104 are triggered by the completion of the second and fourteenth cycles of the clock signal 101 respectively.

Each of PWM signals 102,103 and 104 is then passed through a weighting resistor 115,116,117 respectively. The ratio of the values of resistors 115,116,117 is chosen to give the best overall sine wave approximation which in this case is resistor 115 being 51 kΩ, resistor 116 being 36 kΩ and resistor 117 being 51 kΩ.

To produce an approximation to a sine wave from PWM square waves it is desirable to maintain the first harmonic whilst suppressing the third, fifth, seventh etc. harmonics. Using the above method as illustrated in FIG. 6 the third and fifth harmonics are essentially removed apart from some residual effects due to resistor tolerances. In the present example it is envisaged that the sine wave generating apparatus will be used to generate sine waves in the range of 7.5 kHz–11.8 kHz to drive the loudspeaker 2 and the transmitted signal from the loudspeaker detected by the microphone 4. When used in this manner the seventh and subsequent harmonics are reduced to levels such that no further filtering or conditioning should be needed to remove the effect of these harmonics since the transmitted signal due to these harmonics should lie outside the band-pass limits of the microphone. If the apparatus is used to generate sine waves at lower frequencies, the effect of the seventh and subsequent harmonics could be removed or diminished by low pass filtering or using more pulse width modulated signals to produce a better approximation to a sine wave.

The output from each resistor 115,116,117 is combined at common line 118 to produce the approximation to a sine wave 105 shown in FIG. 6. The signal 105 is low pass filtered by capacitor 119 connected between common line 118 and earth and is detected at connection point 120.

Figure 8:
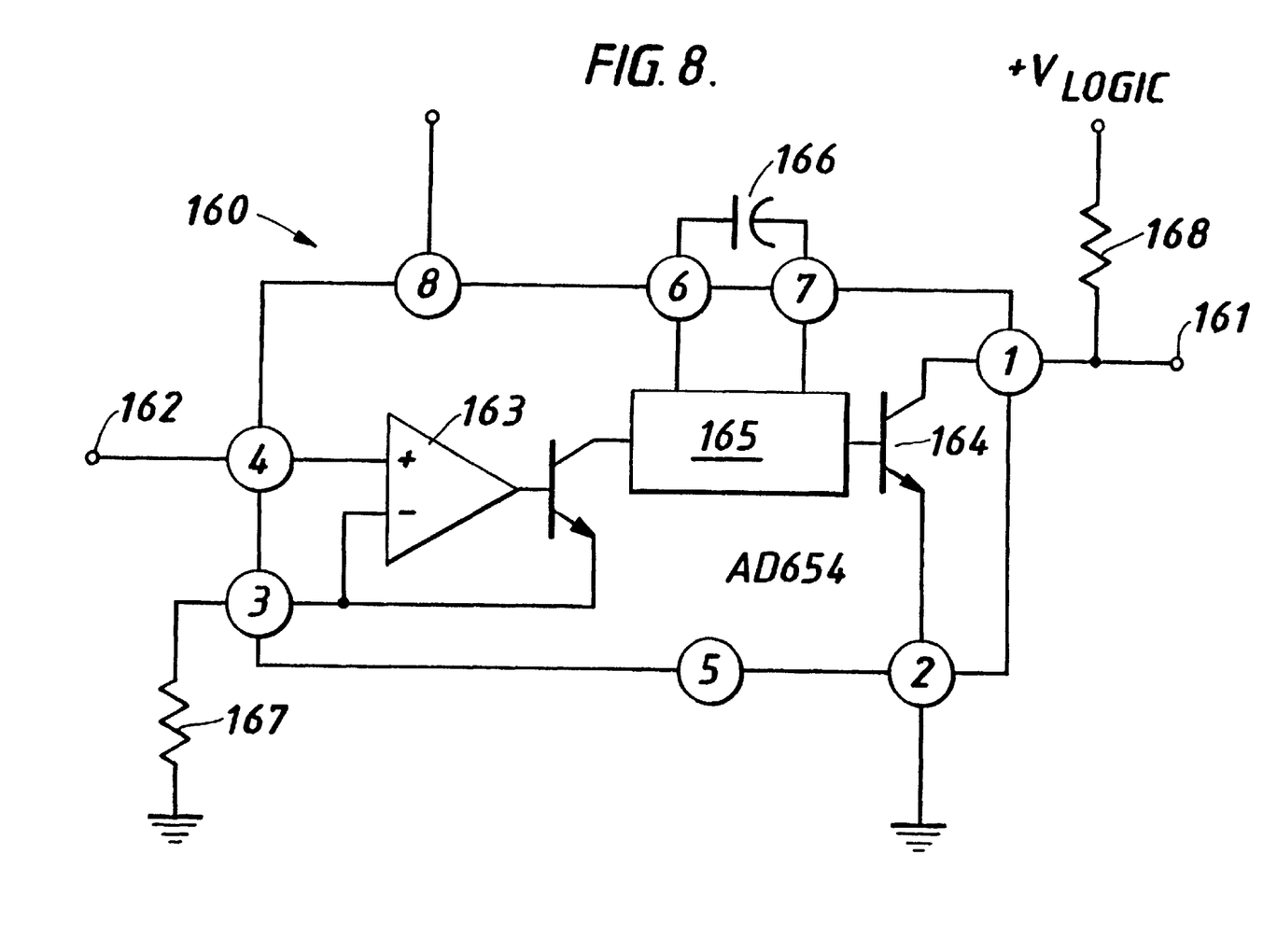
FIG. 8 shows a voltage controlled oscillator to supply the clock signal to the system shown in FIG. 6.

FIG. 8 shows a voltage controlled oscillator 160 which produces an oscillating output at 161, the frequency of which is dependent upon the voltage of a driving signal applied at input 162. However any device the output frequency of which is dependent upon the analogue value of an input is suitable.

The present example of the invention uses an Analog Devices AD654 voltage to frequency converter. The AD654's block diagram appears in FIG. 8. A versatile operational amplifier 163 serves as the input stage; its purpose is to convert and scale the input voltage signal 162 to a drive current. A drive current is delivered to current to frequency converter 165 (an a stable multivibrator). The output of converter 165 controls transistor 164.

In the connection scheme of FIG. 8, the input amplifier 163 presents a very high (250 mΩ) impedance to the input voltage at 162, which is converted into the appropriate drive current by the scaling resistor 167 at Pin 3. In this example resistors 167 and 168 are 1.2 kΩ.

The frequency of the approximation to a sine wave produced at the output connection point 120 shown in FIG. 7 cannot always be accurately assumed from the voltage of the driving signal applied at input 162 shown in FIG. 8 due to variations in temperature and the performance of electrical components for example. Consequently the microprocessor 110 may also be connected to any of lines 112,113 or 114 carrying PWM signals 102,103 and 104 respectively which are at the same frequency as the output approximation to a sine wave as described later. The microprocessor counts the number of cycles of the selected PWM signal over a given period of time such as one second. The actual output frequency of the sine wave can then be accurately determined. The microprocessor 110 counts the number of cycles of a PWM signal 102,103,104 rather than the cycles of the approximation to a sine wave 105 over a given period of time as the PWM signals have more precisely defined, clear on/off states which are easier to count providing better results.

Alternatively the microprocessor 110 could count the number of cycles of the clock signal 101 over a given period of time and from this determine the sine wave frequency by dividing by the number of clock signal cycles required to produce each PWM signal cycle.

Alternatively or additionally the microprocessor may measure the time taken to produce a predetermined number of clock cycles or PWM cycles and from this calculate the frequency of the approximation to a sine wave.

As the oscillator 160 produces an oscillating signal with a continuous range of frequencies, sine waves may be generated with a continuous range of frequencies.

Use of a variable frequency square wave generating oscillator which is a readily available, small, (9.91 mm×7.87 m×4.57 mm in 8-pin plastic DIP form or 4.90 mm×3.91 mm×2.39 mm in 8-Pin SOIC form for the AD 654), cheap device in conjunction with a microprocessor to produce approximations to a sine wave enables the production of a device which is able to generate approximations to sine waves over a continuous range of frequencies and which is compact and so may be mounted on a compact probe for example or in a compact housing. Since a microprocessor is generally employed in many probes or electronic systems for other purposes, the only additional space that is required to produce approximations to sine waves over a continuous range of frequencies is that for the compact variable frequency square wave generating oscillator.

The oscillator need not be a voltage controlled oscillator but may be any device arranged to supply a signal with a continuous range of frequencies.

The approximation to a sine wave need not be generated from three PWM signals but could be generated from any suitable number depending upon the required level of the approximation to a sine wave. Furthermore each cycle of the sine wave need not correspond to sixteen clock cycles but could be eight, thirty two or any suitable number.

Figure 9:
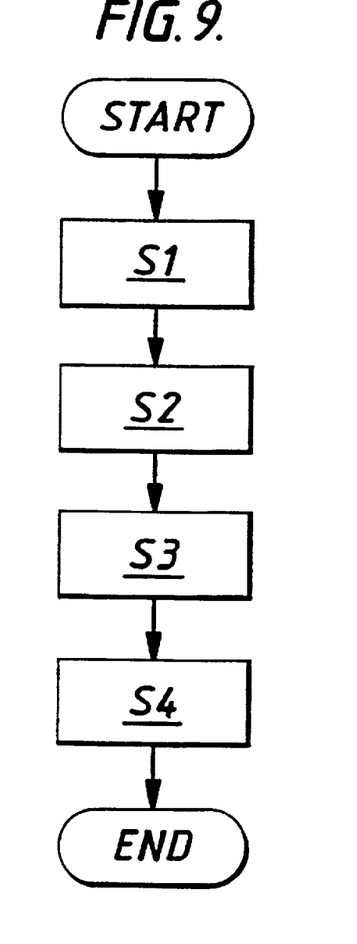
FIG. 9 shows a sequence of operations to determine the resonant frequency.

To quickly and accurately determine the resonant frequency (the frequency at which the amplitude of the signal produced by the microphone is a maximum) an initial fast, coarse frequency sweep is made (in this case 10–15 Hz steps) over the frequency range in which the resonance may occur as shown by S1 in FIG. 9. A control means such as a microprocessor identifies a narrower frequency range within the initial coarse frequency sweep in which a maximum occurs. A further frequency sweep S2 is made with smaller frequency steps (in this case 1 Hz) within this identified narrower frequency range to accurately determine the frequency at which the maximum occurs, identifying the frequency of resonance.

Using the above combination of coarse then fine frequency sweeps over a narrower frequency range, an accurate value of the resonant frequency may be quickly determined for example in a fraction of a second. A control means such as a microprocessor may average subsequent detected frequency values S3 to reduce errors due to noise. The frequency of the PWM signal may then be determined S4 to indicate the frequency of the generated sine wave driving the loudspeaker 2 at resonance.

The determination of the resonant frequency will now be explained in detail.

A microprocessor, which in this case is the microprocessor 110 described earlier which also generates the PWM signals, is used to perform an algorithm to determine the resonant frequency of the gas within the resonator. Instead of the microprocessor 110 a PC could be used with an appropriate plug-in data acquisition card.

Figure 10:
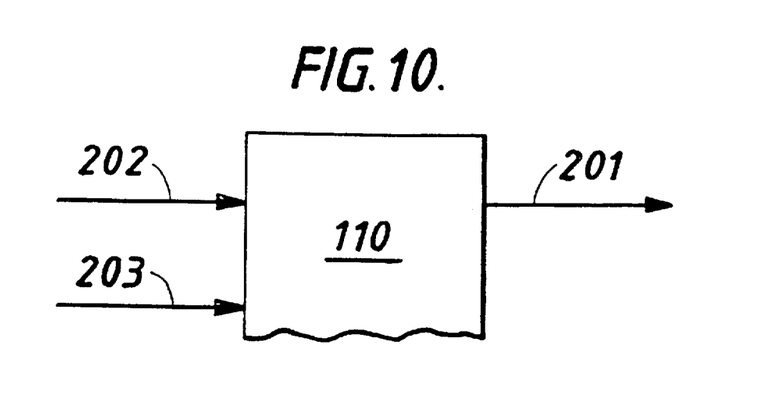
FIG. 10 shows the connections to a processing means to determine resonant frequency.

To determine the resonant frequency, as shown in FIG. 10, the microprocessor 110 has an analogue output 201, a digital input 202 and an analogue input 203.

The analogue output 201 is connected to input 162 of voltage to frequency convertor 160 shown in FIG. 8, to control the frequency applied to loudspeaker 2. In this case the analogue output 201 consists of two outputs (not shown), both of which are connected to input 162 of voltage to frequency converter 160. One output controls the coarse frequency sweep and the other controls the fine frequency sweep. Each of the two outputs is passed through a digital to analogue converter, which in this case is provided in the microprocessor 110 itself, and an appropriate resistor to provide the required level of resolution. In this case the resistor for the coarse frequency control is 36 KΩ and the resistor for the fine frequency control is 2.2 MΩ.

As explained earlier, the frequency of the approximation to a sine wave signal which drives the loudspeaker cannot always be accurately assumed from the voltage of the driving signal from analogue output 201 due to temperature variations and the performance of electrical components for example. Thus one of the PWM signals 102,103,104 which are each at the same frequency as the approximation to a sine wave driving the loudspeaker 2 or the clock signal 101, is applied at digital input 202 for the microprocessor 110 to calculate the frequency of the approximation to a sine wave 105 as described earlier.

The analogue input 203 represents the amplitude of the signal being received by the microphone and is connected to microprocessor 110 via an external Analogue to digital converter. The process of locating the resonant frequency is one of identifying the frequency at which the analogue input 203 is a maximum.

The process of locating the resonant frequency can be broken down into four stages. The first three stages S1, S2, S3 each involve changing the loudspeaker frequency to search for the resonance. When the resonance has been located, the final stage S4 measures the resonant frequency.

The first stage S1 is a fast scan through the permissible range of frequencies taking about one reading of the analogue input 203 for each step of the analogue output voltage 201. The permissible range of frequencies is selected to restrict the scan to those frequencies at which the non-radial resonance should occur for the expected combination of gas composition, temperature and pressure. The limits of the permissible range are imposed to reduce the time taken to locate the resonant frequency and also to reduce the risk of locating an unwanted resonant peak. Although the exact relationship between the control voltage from the analogue output 201 and the microphone frequency is not known, it can be approximated sufficiently well to be used to set the frequency limits of the permissible range within which to search for the resonance. In the present example the frequency range is 7.5 kHz to 11.8 Khz (4.3 kHz) with a frequency scan rate of 86 kHz/second and a microphone sampling rate of 100,000 samples/second producing a total of 5100 microphone samples in each direction.

To locate the resonance frequency the processor is arranged to look for a peak in the amplitude of a signal from the microphone at input 203 and then ascertain the frequency control voltage that was being used at the time.

To allow for the finite time the hardware takes to produce a change in the amplitude of the signal from the microphone at input 203 as a result of a change in the frequency control voltage at output 201, the fast scan of the first stage S1 involves a first scan up through the range of analogue output voltages 201 and a second scan down through the same range of analogue output voltages. Clearly the first scan could alternatively be down through the range of analogue output voltages and the second scan could be up through the range. When scanning up, the frequency control voltage 201 being applied when the peak is detected will be, due to the response time, slightly higher than the voltage that caused the peak to occur. When scanning down, the frequency control voltage 201 will be slightly lower than the peak voltage. Assuming that the response time is the same for both scan directions, the average of the two voltages will give the true voltage at the resonance.

Figure 11:
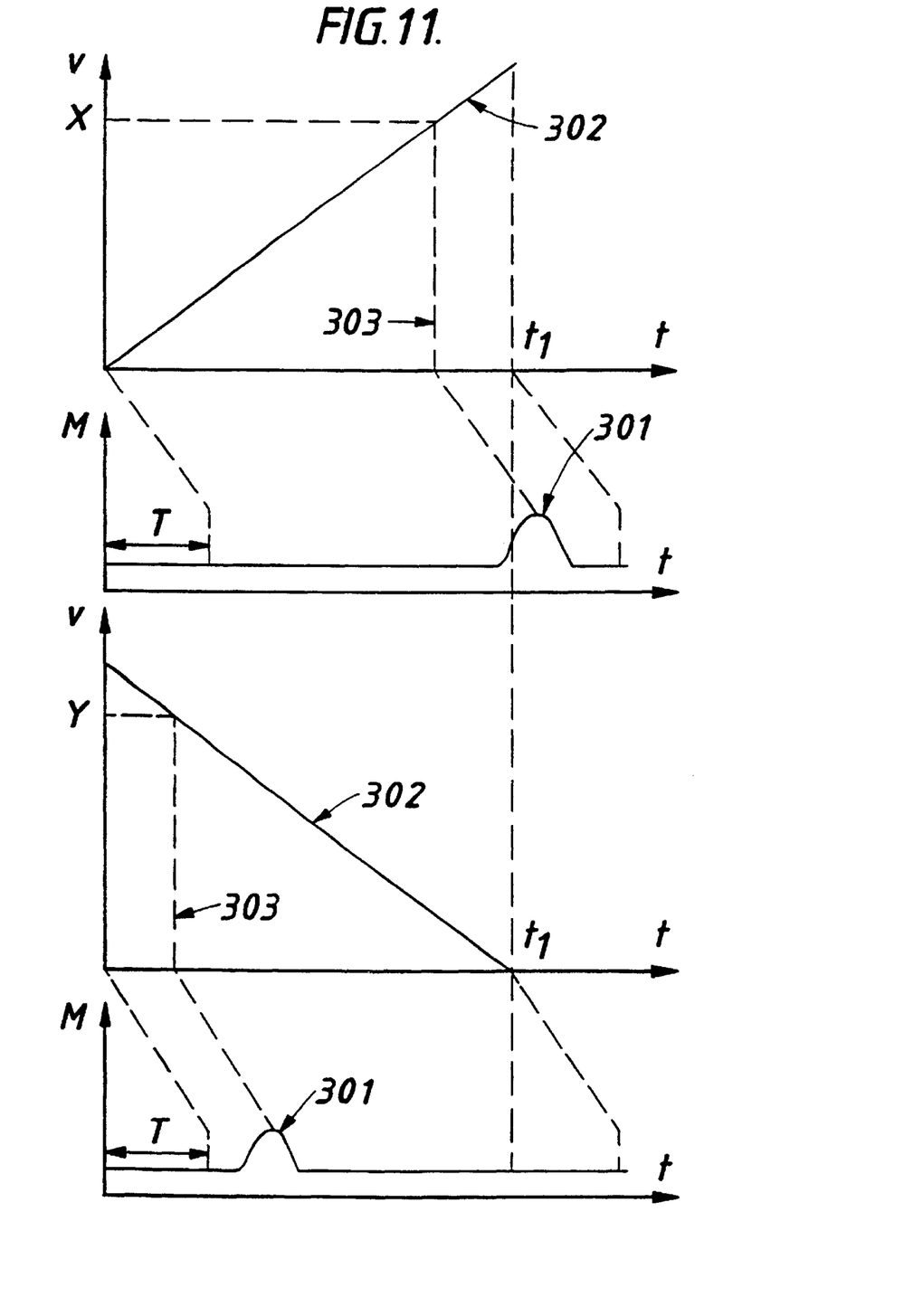
FIG. 11 shows a method of allowing for the finite hardware response time.

A second method of allowing for the finite response time of the hardware is shown FIG. 11 in conjunction with the above method of first and second scans in opposite directions. The second method uses an estimated value for the response time T to match the peak 301 of the received microphone data values M to the frequency control voltage V which, according to the estimated response time T and the characteristic of the frequency control voltage with time 302, produced that microphone data value as shown by the broken lines 303 in FIG. 11. Conseauently the microphone continues to collect data for a time after the frequency control voltage V has finished scanning at time $t_1$. This second method enables peaks that lie near to the end of the scan limits such as peak 301 in the upward scan of frequency control voltage 302 in FIG. 11 to be found which if the collection of microphone data M had been synchronised to the scanning of the frequency control voltage 302 would have been missed. If the estimated response time was accurate, the values X,Y found for the voltages producing the resonant peak in each of the up and down scans would be exactly the same. However, as shown in FIG. 11, the estimated value may be slightly inaccurate in which case the up and down values of the frequency control voltage will be slightly different and will then be averaged.

The second stage S2 uses the scanning method of the first stage except over a smaller frequency range, identified in the first stage as containing the resonant peak. The second stage uses the value for the frequency control voltage at resonance obtained by the first stage as its centerpoint for its smaller frequency scan range. In this example the frequency scan range of the second stage is 150.5 Hz.

However the result of the first scan may be too close to one of the end limits of the frequency control voltage range for the second stage to be able to use it as a centerpoint. In this case the scan of the second stage will be anchored at the appropriate end limit of the frequency control voltage range.

The frequency control voltage step size is also different for the second stage. For speed, the first stage does not use the full frequency control voltage resolution whereas the second stage does to produce a more precise resonance frequency value.

The second stage also uses a slower rate of change of loudspeaker frequency with time. In this case 2.15 kHz/second rather than 86.0 kHz/second used in the first stage. In this example the microphone sampling rate of the second stage is also lower at 25,000 samples/second producing a total of 1800 microphone samples.

The final value is obtained using the third stage S3 which uses a further scan which averages the microphone data and hence produces a dependable result. Like the second stage, this stage uses the result obtained by the preceding scan as its centerpoint. If the result of the second scan is too close to an end limit of the frequency control voltage range for the third stage S3 to be able to use it as a centerpoint, the third scan could be anchored at an appropriate end limit of its frequency control voltage range. However, the scan of this third stage is slower and more methodical than the scans of previous stages. Hence, it covers a range of fewer frequency control voltage values, generally 24 or less, and in this case 21. For each value the analogue output 201 is set and then the circuit is left to settle for a few milliseconds, in this case 5 milliseconds. When the settling time has elapsed, a given number of samples of the microphone voltage are taken, in this case 20, and summed. This process is repeated for each frequency control voltage value and the peak value ascertained. This is the resonant frequency control voltage value.

The final fourth stage S4 comprises holding the frequency at the resonant value and measuring the frequency of the signal driving the loudspeaker 2 using a PWM signal 102,103,104 or clock signal 101 supplied to the digital input 202 to find the resonant frequency of the gas within the resonator. From the determined resonant frequency (f) the speed of sound of the gas (c) is calculated using the expression c=fk where k is a calibration constant for the resonator as explained earlier. The speed of sound within a gas is a useful characteristic, enabling many other characteristics of the gas to be determined.

The method of determining the resonant frequency may be provided as a computer program on a carrier medium such as a rom in the form of a CD-ROM or floppy disk

What is claimed is:

1. A method of determining a frequency at which a resonator resonates comprising:
   driving an acoustic transmitter for applying an acoustic signal to the interior of a resonator by scanning through a first range of frequencies in substantially equidistant steps of a first size;
   detecting a signal from an acoustic receiver arranged to detect the amplitude of an acoustic signal within the resonator produced by driving the acoustic transmitter over the first range of frequencies;
   determining a frequency at which a maximum occurs in the detected signal for the first range of frequencies;
   driving the acoustic transmitter by scanning through a second range of frequencies containing the determined frequency from the first range of frequencies, the second range being smaller than the first range, and scanning through the second range of frequencies in substantially equidistant steps of a second size which is smaller than the steps of the first size;
   detecting a signal from the acoustic receiver produced by driving the acoustic transmitter over the second range of frequencies and
   determining a frequency at which a maximum occurs in the detected signal for the second range of frequencies.

2. A method according to claim 1, wherein for the determination of a frequency at which a maximum occurs in the second range of frequencies, the acoustic transmitter is driven by scanning though the second range of frequencies in a first direction and a primary frequency at which a maximum occurs is determined, the acoustic transmitter is then driven by scanning through the same range of frequencies in the opposite direction and a secondary frequency at which a maximum occurs is determined and the primary and secondary frequencies at which maxima occurred are averaged to produce an average frequency at which a maximum occurs.

3. A method according to claim 1, wherein each determination of a frequency at which a maximum occurs in the first and second ranges of frequencies comprises the acoustic transmitter being driven by scanning through a range of frequencies in a first direction and a primary frequency at which a maximum occurs being determined, the acoustic transmitter then being driven by scanning through the same range of frequencies in the opposite direction and a secondary frequency at which a maximum occurs being determined and the primary and secondary frequencies at which maxima occurred being averaged to produce an average frequency at which a maximum occurs.

4. A method according to claim 1, wherein a signal continues to be detected from the acoustic receiver for a period of time after the acoustic transmitter has completed the scan.

5. A method according to claim 4, wherein the signal detected from the acoustic receiver is matched to a signal driving the acoustic transmitter by a predetermined correction offset.

6. A method according to claim 1, wherein the second range of frequencies is centred around the frequency determined to be that at which a maximum occurs in the first range of frequencies.

7. A method according to claim 1, wherein the acoustic transmitter scans through the second range of frequencies at a slower rate than it scans through the first range of frequencies.

8. A method according to claim 1, including a further scan through a third range of frequencies in which the acoustic transmitter is driven such that a predetermined number of two or more samples of the signal detected from the acoustic receiver are made at each frequency at which the acoustic transmitter is driven and the predetermined number of samples at each frequency summed and the frequency at which a maximum occurs determined to be the frequency with the largest sum.

9. A method according to claim 8, wherein samples are not taken of the signal detected from the acoustic receiver until a settling time has elapsed after the acoustic transmitter is driven at a new frequency within the scan through the third range of frequencies.

10. A method according to claim 8, wherein the third range is smaller than the second range and is centred around the frequency determined to be that at which a maximum occurs in the second range of frequencies.

11. A method according to claim 1, wherein the frequency at which a maximum occurs is determined by counting the cycles of a signal driving the acoustic transmitter when the maximum occurs.

12. An apparatus for determining a frequency at which a resonator resonates comprising:
   means for driving an acoustic transmitter arranged to apply an acoustic signal to the interior of a resonator by scanning through a first range of frequencies in substantially equidistant steps of a first size;

means for detecting a signal from an acoustic receiver arranged to detect the amplitude of an acoustic signal within the resonator produced by driving the acoustic transmitter over the first range of frequencies;

means for determining a frequency at which a maximum occurs in the detected signal from the first range of frequencies;

means for driving the acoustic transmitter by scanning through a second range of frequencies containing the determined frequency from the first range of frequencies, the second range being smaller than the first range, and scanning through the second range of frequencies in substantially equidistant steps of a second size which is smaller than the first size;

means for detecting a signal from the acoustic receiver produced by driving the acoustic transmitter over the second range of frequencies and means for determining a frequency at which a maximum occurs in the detected signal for the second range of frequencies.

13. An apparatus according to claim 12, wherein the driving means is arranged to drive the acoustic transmitter to scan through the second range of frequencies in a first direction and the determining means is arranged to determine a primary frequency at which a maximum occurs, the driving means being arranged to then drive the acoustic transmitter by scanning through the same range of frequencies in the opposite direction and the determining means being arranged to determine a secondary frequency at which a maximum occurs and the apparatus being provided with means to average the primary and secondary frequencies at which maxima occur to produce an average frequency.

14. An apparatus according to claim 12, wherein the driving means is arranged to drive the acoustic transmitter over each of the first and second ranges of frequencies by scanning through a range of frequencies in a first direction and the determining means being arranged to determine a primary frequency at which a maximum occurs, the driving means being arranged to then drive the acoustic transmitter by scanning through the same range of frequencies in the opposite direction and the determining means determining a secondary frequency at which a maximum occurs and the apparatus being provided with means to determine an average of the primary and secondary maxima.

15. An apparatus according to claim 12, wherein the detecting means is arranged to continue to detect a signal from an acoustic receiver for a period of time after the driving means has finished driving the acoustic transmitter.

16. An apparatus according to claim 15, including means to match the signal detected from the acoustic receiver to a signal driving the acoustic transmitter by a predetermined correction offset.

17. An apparatus according to claim 12, wherein the driving means is arranged to drive the acoustic transmitter over the second range of frequencies by centering the second range around the frequency determined to be that at which a maximum occurs in the first range of frequencies.

18. An apparatus according to claim 12, wherein the driving means is arranged to drive the acoustic transmitter to scan through the second range of frequencies at a slower rate than it scans through the first range of frequencies.

19. An apparatus according to claim 12, wherein the driving means is arranged to drive the acoustic transmitter through a third range of frequencies in which the acoustic transmitter is driven such that a predetermined number of two or more samples of the signal detected from the acoustic receiver are made by the detecting means at each frequency at which the driving means is driven and the apparatus including means to sum the predetermined number of samples at each frequency and the determining means determining the frequency with the largest sum to be that at which a maximum occurs.

20. An apparatus according to claim 19, wherein the detecting means is arranged not to take samples from the acoustic receiver until a settling time has elapsed after the driving means is driven at a new frequency within the scan through the third range of frequencies.

21. An apparatus according to claim 19, wherein the third range is smaller than the second range and is centred around the frequency determined to be that at which a maximum occurs in the second range of frequencies.

22. An apparatus according claim 12, including means to determine the frequency at which a maximum occurs by counting the cycles of the driving means at the frequency at which the maximum occurs.

23. A carrier medium with a computer program to perform the method according to claim 1.

* * * * *